No. 841,768. PATENTED JAN. 22, 1907.
S. E. DAVIS.
SCRAPER FOR DISK DRILLS.
APPLICATION FILED OCT. 1, 1906.

Witnesses.
H. C. Kilgore,
A. H. Opsahl.

Inventor.
Spencer E. Davis.
By his Attorneys,
Williamson & Merchant

UNITED STATES PATENT OFFICE.

SPENCER E. DAVIS, OF MINNEAPOLIS, MINNESOTA, ASSIGNOR TO MONITOR DRILL COMPANY, OF ST. LOUIS PARK, MINNESOTA, A CORPORATION OF MINNESOTA.

SCRAPER FOR DISK DRILLS.

No. 841,768.  Specification of Letters Patent.  Patented Jan. 22, 1907.

Application filed October 1, 1906. Serial No. 336,817.

*To all whom it may concern:*

Be it known that I, SPENCER E. DAVIS, a citizen of the United States, residing at Minneapolis, in the county of Hennepin and State of Minnesota, have invented certain new and useful Improvements in Scrapers for Disk Drills; and I do hereby declare the following to be a full, clear, and exact description of the invention, such as will enable others skilled in the art to which it appertains to make and use the same.

My invention has for its object to provide a simple, cheap, and efficient scraper for disk drills, the blade of which may be easily detached from and applied to its supporting-arm and reversed, so that either side of its scraping edge may be engaged with the disk.

To the above ends the invention consists of the novel devices and combinations of devices hereinafter described, and defined in the claims.

The invention is illustrated in the accompanying drawings, wherein like characters indicate like parts throughout the several views.

Figure 1:
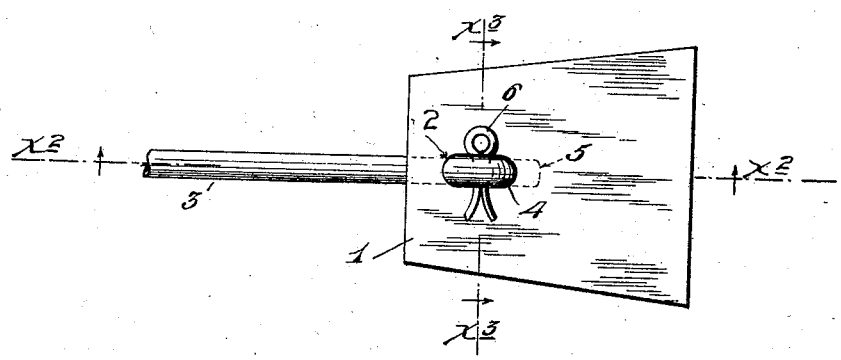
Figure 2:
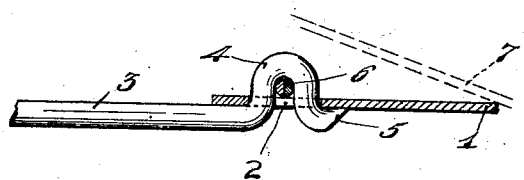
Figure 3:
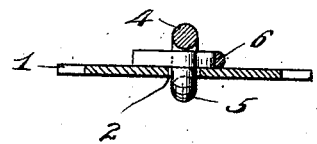

Referring to the drawings, Figure 1 is a side elevation showing a scraper and a scraper-supporting arm, said parts embodying my invention. Fig. 2 is a view, partly in plan and partly in horizontal section, on the line $x^2 x^2$ of Fig. 1; and Fig. 3 is a detail in transverse section, taken on the line $x^3 x^3$ of Fig. 1.

The scraper-blade 1 forward of its rear edge and intermediate of its sides is provided with a perforation 2, that is elongated longitudinally of said scraper-blade. The blade is supported by an arm which is preferably in the form of a spring-rod 3, one end of which is adapted to be secured to the disk-boot by any suitable means—such for instance, as a socket and coöperating set-screw.

At its free end the supporting arm or rod 3 is bent laterally in the form of a U-shaped yoke 4, the extremity of which terminates in a stop-lug or projection 5. The yoke 4 is adapted to be freely passed through the perforation 2 of the scraper-blade 1, and the scraper-blade is adapted to be secured thereto by means of an ordinary split key or cotter 6, which is passed through the crotch of the said yoke and bears against the adjacent face of the scraper-blade.

In Fig. 2 the numeral 7 indicates a portion of a drill-disk (indicated by dotted lines) against which the scraper-blade 1 is pressed, preferably under the spring-tension of the spring-arm 3. As is evident, to reverse the scraper-blade side for side it is only necessary to remove the cotter 6, to remove and turn over the said blade, and to reapply the same to the yoke 4 and the cotter to the said yoke.

The device described, as is obvious, is of very small cost, has very few parts, and at the same time is strong and durable and generally efficient for the purposes had in view.

The important purpose of making a scraper-blade reversible side for side will be understood by most persons familiar with the use of disk drills and similar machines. For the benefit of those who do not know this to be a fact it may be stated that a scraper made from a flat piece of metal with its scraping edge cut at a right angle the scraper will do its best work while the corner edge which engages the disk is quite sharp and unworn and will do its poorest work after the corner edge is worn off, so that there is quite an extended surface of the disk worn into flat engagement with the disk. When a scraper is thus worn away, it should be reversed side for side, so that the sharp edge of the scraper will be brought into engagement with the face of the disk.

What I claim is—

1. The combination with a supporting arm or rod bent in the vicinity of its free end to form a U-shaped yoke, of a scraper-blade having a perforation adapted to receive the said yoke, and a key or lock device passed through the crotch of said yoke and bearing against the adjacent face of said blade, substantially as described.

2. The combination with a supporting arm or rod 3 bent at its free end to form the U-shaped yoke 4 and stop-lug or projection 5, of a scraper-blade 1 having a perforation 2 adapted to receive said yoke 4, and a split key or cotter 6 passed through the crotch of said yoke 4 and bearing against the adjacent face of said blade, substantially as described.

In testimony whereof I affix my signature in presence of two witnesses.

SPENCER E. DAVIS.

Witnesses:
 MALIE HOEL,
 F. D. MERCHANT.